United States Patent Office 3,412,134
Patented Nov. 19, 1968

3,412,134
PROCESS FOR THE PREPARATION OF
UNSATURATED NITRILES
Daniel G. Jones, Pennington, N.J., assignor to Mobil Oil
Corporation, a corporation of New York
No Drawing. Filed Feb. 24, 1965, Ser. No. 435,039
13 Claims. (Cl. 260—465)

ABSTRACT OF THE DISCLOSURE

A process for the preparation of a nitrile which comprises reacting a mixture containing ammonia, oxygen and an unsaturated hydrocarbon having at least one activated methyl radical wherein the activated methyl radical is one that is connected to a carbon atom which in turn is connected to another carbon atom through an unsaturated bond (e.g., propylene, toluene, propyne and etc.) in the presence of a catalyst comprising a zeolite molecular sieve having an ordered internal structure to produce a nitrile corresponding to the unsaturated hydrocarbon in the mixture.

---

This invention relates to the preparation of nitriles. More particularly, this invention relates to the preparation of nitriles by reacting an unsaturated hydrocarbon with ammonia in the presence of a molecular zeolite sieve.

In the past, preparation of nitriles has been effected by reacting an unsaturated hydrocarbon with ammonia in the presence of such catalysts as alumina supported molybdic oxide, vanadium oxide and the like. The use of these and other comparable catalysts has not proved to be particularly effective as it has not been possible to obtain reproducible yields of the desired nitrile. Yields obtained have varied from batch to batch.

The present invention provides for the preparation of nitriles by the reaction of unsaturated hydrocarbons with ammonia in the presence of a molecular zeolite sieve whereby relatively high yields of the corresponding nitrile are effected in a relatively short period of time. Moreover, the present invention provides for reproducibility of product yields.

Illustrative unsaturated hydrocarbons which are reacted with ammonia to produce the corresponding nitriles, in accordance with the present invention, are those having the formula:

FORMULA I (CH₃)R wherein R is an unsaturated monovalent hydrocarbon radical generally containing 2 to 20 carbon atoms inclusive, and preferably containing 2 to 7 carbon atoms inclusive, and wherein the methyl radical (CH₃), which is an "activated" methyl radical, is connected to a carbon atom which in turn is connected to another carbon atom through an unsaturated bond. The unsaturated bond may be a double bond, either olefinic or aromatic unsaturation, or may be a triple bond. It is to be understood that the monovalent hydrocarbon radical can have one or more unsaturated bonds as well as have one or more "activated" methyl radicals. As stated, an "activated" methyl radical is one which is connected to a carbon atom which in turn is connected to another carbon atom through an unsaturated bond.

Among suitable compounds falling within the scope of Formula I, can be noted: propylene, 2-butene, 2-butyne, toluene, the xylenes, the methyl napthtalenes, cyclohexylene, and the like.

The reaction which results in the preparation of nitrile, in accordance with this invention, can be illustrated by the reactions which follow:

Equation I—Reaction of propylene with ammonia

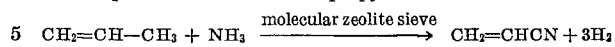

Equation II—Reaction of 2-methylbutadiene-1,3 with ammonia

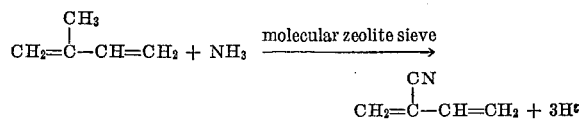

Equation III—Reaction of propylene with ammonia

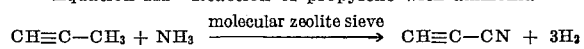

Equation IV—Reaction of toluene with ammonia

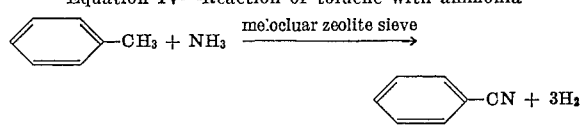

Equation V—Reaction of 2,3-dimethylbutadiene-1,3 with ammonia

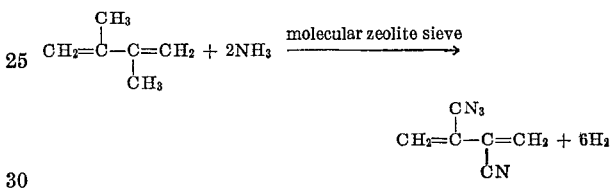

Ammonia in any of its available forms can be used as one of the reactants, for instance, ammonia in aqueous solutions, liquid ammonia and gaseous ammonia. Also compounds which yield ammonia, generally under the influence of heat, such as urea and ammonium salts can be effectively used.

In conducting the reaction between an unsaturated hydrocarbon and ammonia in the presence of a molecular zeolite sieve, it is preferred to effect the reaction in an oxygen atmosphere. The oxygen atmosphere can be provided by air or any other oxygen containing gas. The oxygen reacts with the hydrogen, which is split off during the reaction, to form water. Removal of water from the reaction system can be accomplished quickly and easily. Sufficient oxygen is used to react with substantially all of the hydrogen liberated.

Various amounts of the reactants can be used for purposes of the present invention. As a rule, the amount of ammonia used will be at least about 90 percent of stoichiometric, generally about 90 percent of stoichiometric to about 10 times in excess of stoichiometric. More than about 10 times the stoichiometric amount can be used but this is economically undesirable and does not materially increase the yield of nitrile formed.

For purposes of stoichiometric calculations, one molecule of ammonia is considered to react with the "activated" methyl group.

The temperature at which the reaction between the unsaturated hydrocarbon and ammonia is conducted can vary over a wide range from as low as about 0° C. to about 600° C. At temperatures below about 0° C., the reaction proceeds rather sluggishly. A reaction temperature in the range of about 30° C. to about 400° C. is most preferred.

The preparation of nitriles, in accordance with the present invention, can be conducted under atmospheric, subatmospheric or superatmospheric pressures. It is preferred to conduct the reactions of this invention at superatmospheric pressures, generally in excess of about 500 p.s.i.g. At such pressures, extended catalytic activity of the zeolite molecular sieves is effected along with improved yields of product.

The amount of zeolite molecular sieve used will vary and depend in part, on whether the process used is a batch type operation, a continuous operation or a semi-continuous operation. Generally, with a batch type operation, the amount of zeolite molecular sieve will vary from about 5 percent by weight to about 25 percent by weight, based on the weight of the unsaturated hydrocarbon charged.

In continuous or semi-continuous operations in which one or more reactor vessels are employed with cyclic regeneration of the zeolite molecular sieve, the amount of molecular sieve used, as measured in terms of the liquid hourly space velocity of the unsaturated hydrocarbon, can be in the range of about 0.1 to about 10.

It is to be understood that the zeolite molecular sieves can be regenerated by burning off their contaminants at a temperature of about 500° C.

As previously stated, the preparation of nitriles, in accordance with this invention, is conducted utilizing as a catalyst, a zeolite molecular sieve, which can be either a natural or a synthetic alumino-silicate.

In accordance with the present invention, several different types of zeolite sieves can be employed as catalysts. Particularly effective catalysts are the alumino-silicates that contain a high concentration of hydrogen sites within an ordered internal structure. These hydrogen sites may be produced by ionically bonding or chemisorbing certain polyvalent metal cations and/or hydrogen ions within the molecular structure of the alumino-silicate. Such bonding or chemisorption can be effected by base exchange of the alumino-silicate with a fluid medium containing the metal cations and/or hydrogen ions, the resulting exchanged product often acquiring an acid character. The catalysts that are most preferred are those which are produced by exchanging an alumino-silicate with polyvalent metals that are heavy metals, e.g. iron, cobalt, and the rare earth metals.

Alumino-silicate catalysts having a high concentration of hydrogen sites can be prepared from a variety of naturally occurring and synthetic alumino-silicates. These alumino-silicates have exchangeable metal cations (e.g., alkali metals and alkaline earth metals) that can be completely or partially replaced, by conventional base exchange, with certain polyvalent metal cations and/or hydrogen ions.

Some alumino-silicates can be base exchanged directly with hydrogen ions, as indicated in the preceding paragraph, to form products which have an acid character and which are suitable for use as catalysts. Other alumino-silicates such as zeolite Z, a synthetic faujasite, are either not suitable for direct base exchange with hydrogen ions, or are not structurally or thermally stable after a portion of their exchangeable metal cations have been replaced with hydrogen ions. Thus, it is often necessary to exchange other metal cations with these alumino-silicates in order to achieve the necessary stability within the ordered internal structure prior to the inclusion of the hydrogen ions.

Furthermore, the stability and the distribution of active cation sites formed within an alumino-silicate is also affected by the silicon to aluminum atomic ratio within its ordered internal structure. In an isomorphic series of crystalline alumino-silicates, the substitution of silicon for aluminum in the rigid framework of the lattice results in a decrease of total cation sites as evidenced by reduction of exchange capacity and proved by elemental analysis. Thus, among the faujasite isomorphs, the zeolite known as "Y" will have a sparser distribution of sites within its pores than the zeolite known as "X."

It has been found that alumino-silicates having a high silicon to aluminum atom ratio are particularly desirable as catalysts, for purposes of this invention. As a rule, the ratio of silicon to aluminum atoms is at least about 1.8 to 1, in this preferred type catalyst. These catalysts are readily contacted with solutions which contain hydrogen ions and are readily regenerated, after having been used, by contact at elevated temperatures with an oxygen containing stream under controlled conditions such that carbonaceous residues can be efficiently removed without damage to the essential structure and properties of the catalyst.

It will also be appreciated that the concentration of the hydrogen sites, may vary according to the cations employed, the degree of base exchange, as well as the alumino-silicate being treated. Accordingly, it has been determined that the alumino-silicates having at least 0.5 milliequivalent of hydrozen per gram of solid and preferably above about 0.75 milliequivalent of hydrogen per gram of solid are effective catalysts for purposes of this invention. It will be understood that this value indicates the total concentration of hydrogen ions present within an alumino-silicate and that the spatial concentration of these ions is dependent on the ordered internal structure of the specific alumino-silicate being treated.

Because the unique activity of the alumino-silicate catalyst for effecting the reactions of the present invention is dependent on the availability of active cation sites therein, as well as the nature of these sites, the defined pore size of the alumino-silicate is to be considered during its preparation. In general, the alumino-silicate should have a pore size of such dimensions that it can accept the reactants of this invention within its ordered internal structure and allow egress of the product. Thus, the pore size is from at least about 4 A. and preferably about 6 A. to about 15 A. in diameter. It will be appreciated that the selection of the alumino-silicate catalyst, to be used in a specific application, will depend upon the reactants and also the reaction products.

It will be appreciated that those alumino-silicates having a sparse distribution of hydrogen sites can also be employed as catalysts. Thus, the alkali metal (e.g., sodium, lithium and the like) and alkaline earth metal (e.g., calcium, potassium and the like) forms of the synthetic and naturally occurring alumino-silicates, including zeolite "A" and the faujasites, such as zeolites "X" and "Y," can serve as catalysts. (These zeolites are hereinafter described in greater detail.)

Typical of the alumino-silicates employed in accordance with this invention, are several alumino-silicates, both natural and synethetic, which have a defined pore size of at least about 4 A. and preferably about 6 A. to about 15 A. within an ordered internal structure. These alumino-silicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the alumino-silicates may be represented by the formula:

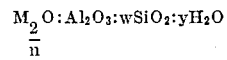

wherein M is a cation which balances the electrovalence of the tetrahedra, $n$ represents the valence of the cation, $w$ the moles of $SiOA_2$, and $y$ the moles of $H_2O$. The cation can be any one or more of a number of metal ions depending on whether the alumino-silicate is synthesized or occurs naturally. Typical cations include sodium, lithium, potassium, calcium, and the like. Although the proportions of inorganic oxides in the silicates and their spatial arrangement may vary, effecting distinct properties in the alumino-silicates, the two main characteristics of these materials are the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline alumino-silicates utilized by the present invention is the synthetic faujasite designated as zeolite X, and is represented in terms of mole ratios of oxides as follows:

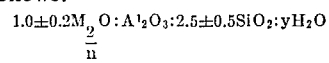

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9Na_2O:Al_2O_3:2:5SiO_2:6.1H_2O$$

Zeolite X is commercially available in both the sodium and the calcium forms.

It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other alumino-silicates are contemplated as also being effective catalytic materials for the invention. Of these other alumino-silicates, a synthetic faujasite, having the same crystalline structure as zeolite X and designated as zeolite Y has been found to be active. Zeolite Y differs from zeolite X in that it contains more silica and less alumina.

Zeolite Y is represented in terms of mole ratios of oxides as follows:

$$0.9\pm0.2Na_2O:Al_2O_3:WSiO_2:XH_2O$$

wherein W is a value greater than 3 up to about 5 and X may be a value up to about 9.

The selectivity of zeolite Y for larger molecules is appreciably the same as zeolite X because its pore size extends from 10 A. to 13 A.

Another synthesized crystalline alumino-silicate, designated as zeolite A, has been found to be effective for the purposes of this invention. This zeolite may be represented in mole ratios of oxides as:

$$1.0\pm0.2M_{\frac{2}{n}}O:Al_2O_3:1.85\pm0.5SiO_2:yH_2O$$

wherein M represents a metal, $n$ is the valence of M, and $y$ is any value up to about 6.

The sodium form of this zeolite may be represented by the following formula:

$$Na_{12}(AlO_2)_{12}(SiO_2)_{12} \cdot 27H_2O$$

This material often designated as a "4A" zeolite, has a pore size of about 4 A. in diameter. When the sodium cations have been substantially replaced with calcium by conventtional exchange techniques, the resulting zeolite is designated as a "5A" zeolite and has a defined pore size of about 5 A. in diameter.

Another alumino-silicate material found to be active in the present process is a naturally occurring zeolite known as mordenite. This zeolite has an ordered crystalline structure having a ratio of silicon atoms to aluminum atoms of about 5 to 1. In its natural state it usually appears as a salt which may be represented by the following formula:

$$Na_8(AlO_2)_8(SiO_2)_{40}24H_2O$$

Mordenite has an ordered crystalline structure made up of chains of 5-membered rings of tetrahedra. The crystal has a system of parallel channels having free diameters larger than 6.5 A. interconnected by smaller channels, parallel to another axis, on the order of 2.8 A. free diameters. As a result of this different crystalline framework, mordenite in proper ionic forms, sorbs benzene and cyclic hydrocarbons. However, it cannot accept some of the larger molecules which will be sorbed by zeolite X and zeolite Y.

It will be appreciated that other alumino-silicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the alumino-silicate advantageously should have ordered internal structure capable of chemisorbing or ironically bonding additional metals and/or hydrogen ions within its pore structure so that its catalytic activity may be altered for a particular reaction. Among the naturally occurring crystalline alumino-silicates which can be employed are faujasite, heulandite, clinoptilolite, chabazite, gmelinite, mordenite and dachiardite.

One of the preferred alumino-silicate catalysts is prepared from the sodium form of zeolite X having a pore size of 13 A. (a commercially available zeolite designated as Linde "13X"), by conventional base exchanging involving partial or complete replacement of the sodium of zeolite X by contact with a fluid medium containing cations of one of the rare earth metals. Any medium which will effect ionization without affecting the crystalline structure of the zeolite can be employed. After such treatment, the resulting exchanged zeolite product is water washed, dried and dehydrated. The dehydration thereby produces the characteristic system of open pores, passages, or cavities of the crystalline alumino-silicates.

As a result of the above treatment, the rare earth exchanged alumino-silicate is an activated crystalline catalyst material in which the molecular structure has been changed by having rare earth cations and hydrogen ions chemisorbed or ionically bonded thereto. It will be appreciated that the defined pore size of the rare earth exchanged zeolite X may vary from above 6 A., generally from 6 A. to 15 A., and preferably in the approximate range of 10 A. to 13 A. in diameter.

Advanatgeously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

Another active catalyst can be produced from zeolite X by base exchange of both rare earth cations and hydrogen ions to replace the sodium cations from the alumino-silicate. This base exchange can be accomplished by treatment with a fluid medium containing the rare earth salts followed by another containing hydrogen ions or cations capable of conversion to hydrogen ions. Inorganic and organic acids represent the source of hydrogen ions, whereas ammonium compounds are representative of the compounds containing cations capable of conversion to hydrogen ions. It will be appreciated that this fluid medium can contain a hydrogen ion, an ammonium cation, or mixture thereof, and have a pH from about 1 to about 12.

Other effective catalysts can be prepared from alumino-silicates such as zeolite Y and mordenite. Exchange of rare earth metals, copper and the like for the sodium cations within zeolite Y produces a highly active catalyst in a manner similar to that described for preparation of the rare earth exchanged zeolite X. In addition, because of its high acid stability, zeolite Y may be treated by partially replacing the sodium ions with hydrogen ions. This replacement can be accomplished by treatment with a fluid medium containing a hydrogen ion or an ion capable of conversion to a hydrogen ion (i.e. inorganic acids or ammonium compounds or mixture thereof).

Zeolite "4A" also can serve as an effective catalyst by being base exchanged with divalent metal cations in a manner similar to that described for preparation of the rare earth exchanged faujasites; in some instances, it is used in its calcium form as the "5A" zeolite.

Mordenite can be activated to serve as a catalyst for the instant invention by replacement of the sodium ion with a hydrogen ion. The necessary treatment is essentially the same as that described above for the preparation of acid zeolite Y except that a mineral acid such as HCl is used as a source of hydrogen ion. In general, the mordenite is reduced to a fine powder (approximately passing a 200 mesh sieve and preferably passing 300 and 325 mesh sieves or finer) and then acid treated.

It will be appreciated that cations of heavy metals other than the rare earths having polyvalences can be employed to replace the exchangeable cations from the alumino-silicates to provide effective catalysts for this invention. Exemplary of these metals are zinc, copper, tin, cobalt, nickel, silver, and the like. Moreover, other higher valence metals such as zirconium, titanium, vanadium, chromium, manganese, iron, and the like can also be employed. As used herein, and defined in Hackh's Chemical Dictionary, Third Edition, p. 529, "heavy metal" refers to a metal with a density above 4. It will further be understood that the chemical properties of the metal, i.e., its atomic radius, degree of ionization, hydrolysis constant, and the like, will determine its suitability for exchange with a particular alumino-silicate material. It will also be appreciated that certain divalent metals such as calcium, barium, and magnesium can be used with ammonium chloride or like ammonium compounds to produce active cation sites within the alumino-silicate catalyst by conventional base exchange techniques, the ammonium ion being decomposed to form hydrogen sites by heating the exchanged alumino-silicate to drive off ammonia.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate. Such materials include by way of examples, dried inorganic oxide gels and gelatious precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline alumino-silicates may be prepared by growing crystals of the alumino-silicate in the pores of the support. Also, the alumino-silicate may be intimately composited with a suitable binder, such as inorganic oxide hydrogel or clay, for example by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of about 55 to about 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal, the oxide of which it is desired to cogel with silica, etc. The relative proportions of finely divided crystalline alumino-silicate and inorganic oxide gel matrix may vary widely with the crystalline alumino-silicate content ranging from about 2 to about 90 percent by weight and more usually, particularly where the composite is prepared in the form of beads, in the range of about 5 to about 50 percent by weight of the composite.

The catalyst of alumino-silicate employed in the process of this invention may be used in the form of small fragments of a size best suited for operation under the specific conditions existing. Thus, the catalyst may be in the form of a finely divided powder or may be in the form of pellets of about $\frac{1}{16}''$ to about $\frac{1}{8}''$ in diameter, obtained upon pelleting the alumino-silicate with a suitable binder such as clay. The zeolite X, described hereinabove, may be obtained on a clay-free basis or in the form of pellets in which clay is present as a binder.

In addition, the unique activity of the zeolite molecular sieves can be continuously maintained, while on stream at a high level. This is accomplished by controlling the sparsity of distribution of active sites within the ordered internal structure of the zeolite molecular sieves. It will be realized, for example, that during reaction of ammonia with an unsaturated hydrocarbon some degradation and polymerization products are formed which coat the zeolite molecular sieve catalyst. This coating blocks off the active sites of the catalyst from contact with the reactants, thus, gradually causing the catalyst to lose its effective activity. The adverse effects of the degradation and polymerization products is conveniently minimized by the introduction of carbon dioxide and other like oxygen-containing compounds into the catalyst zone. It will be appreciated that these activators can be introduced into the charge stream or introduced as a separate stream. Activators are particularly effective when employing, as catalysts, the alkali metal salts of alumino-silicates. In general, the molar ratio between the reactants and the activators can range from about 0.001 to about 5.0.

In the examples that follow, which are illustrative and not intended to limit the scope thereof in any manner, the reactions were conducted in a tubular glass reactor which contained a bed of an alumino-silicate having a particle size of about 8 to about 18 mesh.

Example I.—Production of Acrylonitrile 10 gms. of a chromium exchanged zeolite X catalyst having a pore size of approximately 10 A. are placed into a reactor. A reaction mixture of propylene, ammonia, water and air is introduced into the reactor in the vapor phase at a gas hourly space velocity of 7600. The entering feed had the following composition:

| | Mol percent |
|---|---|
| Propylene | 0.8 |
| Air | 92.2 |
| Ammonia | 2.1 |
| Water | 4.9 |

After continuing this run for 30 minutes at a temperature of 800° F. and a pressure of 100 p.s.i.g., an analysis of the liquid organic effluent shows the following distribution of reaction products:

| | Wt. percent |
|---|---|
| Acrylonitrile | 78.8 |
| Acrolein | 19.7 |
| Other | 1.5 |

The conversion of propylene to acrylonitrile was 35 percent by weight.

Example II

In order to determine the affects of altering the propylene-ammonia ratio on the conversion to acrylonitrile and also on the product distribution, another series of runs are conducted, employing the same operating conditions and in the presence of the same alumino-silicate catalyst as in Example I. The ratio between propylene and air is maintained at 1:100. The resulting data are shown in Table 1.

TABLE 1

| Run No. | Ammonia to Propylene Ratio | Product Composition, wt. percent | | Conversion of Propylene to Acrylonitrile |
|---|---|---|---|---|
| | | Acrylonitrile | Other | |
| 2 | 0.5 | 5 | 95 | 3 |
| 3 | 1.0 | 19 | 79 | 9 |
| 4 | 1.0 | 40 | 60 | 18 |
| 5 | 2.0 | 60 | 40 | 30 |
| 6 | 3.0 | 79 | 21 | 35 |

An inspection of the above data clearly indicates that the process is operative over a wide range of molar ratios between the reactants and that an ammonia-propylene ratio of at least about 2.0 is preferred.

Example III

In another series of runs the affects of employing different metal exchanged alumino-silicate catalysts on the product distribution and conversion to acrylonitrile are shown.

TABLE 2

| | Cr Exchanged Zeolite A | Cr Exchanged Zeolite X | Cr Exchanged Zeolite Y |
|---|---|---|---|
| Conditions: | | | |
| Temperature, ° F | 800 | 800 | 800 |
| Space Velocity, std. vol./hr./vol. cat | 7,600 | 7,600 | 7,600 |
| Pressure | 100 | 100 | 100 |
| Ammonia-propylene mol ratio | 2.6 | 2.6 | 2.6 |
| Product Distribution, wt. percent: | | | |
| Acrylonitrile | 30 | 79 | 79 |
| Acrolein | 20 | 20 | 20 |
| Other | 50 | 1 | 1 |
| Conversion of propylene to acrylonitrile | 10 | 35 | 35 |

These runs show that the small port size of the A zeolite limits diffusion of reactants. Zeolite X and Y are equally effective.

Example IV

In a manner as described in Example I, various unsaturated and aromatic hydrocarbons are reacted with ammonia. The hydrocarbons which are reacted are indicated below:

| Hydrocarbon: | Product |
|---|---|
| Toluene | Benzonitrile. |
| α-Methylnaphthalene | α-Cyanonaphthalene. |
| Propyne | Cyanoethyne. |
| 2,3-dimethylbutadiene-1,3 | 2,3-dicyanobutaniene-1,3. |

Example V.—Production of 2-cyano-1,3-butadiene

A reaction mixture comprising 1 mole of 2,methyl-1,3-butadiene, 2 moles of ammonia, 5 moles water, and 92 moles air is passed through a reactor containing chromium exchanged zeolite X catalyst at a temperature of 800° F.

TABLE 4

| Conditions: | |
|---|---|
| Temperature, ° F. | 800 |
| Space velocity std. vol./hr./vol. cat. | 7600 |
| Pressure, p.s.i.g. | 100 |
| Molar ratio of ammonia/BD | 2 |
| Liquid organic effluent composition, wt. %: | |
| 2-methyl-1,3-butadiene | 70 |
| 2-cyano-1,3-butadiene | 20 |
| Other | 10 |
| Percent conversion to 2-cyano-1,3-butadiene | 12 |

Example VI

The reaction mixture of Example V is contacted with a copper exchanged zeolite X at a temperature of 800° F. After 15 minutes on stream the composition of the exiting liquid organic effluent is as follows:

| | Wt. % |
|---|---|
| 2-methyl-1,3-butadiene | 60 |
| 2-cyano-1,3-butadiene | 18 |
| Other | 12 |

The run was continued for 2 hours before the conversion to 2-cyano-1,3-butadiene dropped from 12% to 6%, indicating that the catalyst had lost 50% of its original activity and should be regenerated. The catalyst bed of copper exchanged zeolite X was then taken off stream, purged of reactants and reaction products and regenerated by burning in air at 900° F.

It will be appreciated that the specific examples enumerated above are merely illustrative of the unsaturated hydrocarbons which can be made into unsaturated nitriles in accordance with the process of this invention, and that other straight and branched chain unsaturated aliphatic, cycloaliphatic, and aromatic hydrocarbons can be reacted to produce nitriles in the presence of the molecular zeolite sieve catalyst.

It will also be appreciated that, as exemplified by the foregoing examples, the operating conditions for the production of unsaturated nitriles in accordance with this invention can be varied, so that the process may be conducted in a gaseous phase, a liquid phase, or a mixed liquid-vapor phase.

What is claimed is:

1. A process for the preparation of an unsaturated nitrile which comprises reacting a mixture of oxygen, ammonia and an unsaturated hydrocarbon having at least one activated methyl radical and represented by the formula:

$$(CH_3)R$$

wherein R is an unsaturated monovalent hydrocarbon radical containing from 2 to 20 carbon atoms and wherein the activated methyl radical is connected to a carbon atom which in turn is connected to another carbon atom through an unsaturated bond, in the presence of a zeolite molecular sieve containing cations of the metals selected from the group consisting of the heavy metals and rare earth metals within an ordered internal structure having a pore size of from about 4 A. to about 15 A. in diameter at a temperature of from about 0° C. to about 600° C. to produce the unsaturated nitrile corresponding to the unsaturated hydrocarbon in said mixture.

2. A process as defined in claim 1 wherein the amount of ammonia used is at least about 90 percent of stoichiometric.

3. A process as defined in claim 1 wherein the amount of ammonia used is about 90 percent of stoichiometric to about 10 times in excess of stoichiometric.

4. A process as defined in claim 1 wherein the unsaturated hydrocarbon is propylene.

5. A process as defined in claim 1 wherein the unsaturated hydrocarbon is toluene.

6. A process as defined in claim 1 wherein the unsaturated hydrocarbon is $a$-methylnaphthalene.

7. A process as defined in claim 1 wherein the unsaturated hydrocarbon is propyne.

8. A process as defined in claim 1 wherein the unsaturated hydrocarbon is 2,3-dimethylbutadiene-1,3.

9. A process as defined in claim 1 wherein the unsaturated hydrocarbon is 2-methylbutadiene-1,3.

10. A process as defined in claim 1 wherein the molecular zeolite sieve contains cations of the heavy metals.

11. A process as defined in claim 1 wherein the molecular zeolite sieve is a chromium exchanged zeolite A.

12. A process as defined in claim 1 wherein the molecular zeolite sieve is a chromium exchanged faujasite.

13. A process as defined in claim 1 wherein the molecular zeolite sieve is a copper exchanged faujasite.

References Cited

UNITED STATES PATENTS

| 2,535,082 | 12/1950 | Mahan | 260—465.3 |
| 3,140,322 | 7/1964 | Frilette et al. | 260—667 |
| 3,231,600 | 1/1966 | Jones et al. | 260—465 |

CHARLES B. PARKER, *Primary Examiner.*

D. M. PAPUGA, *Assistant Examiner.*

UNITED STATES PATENT OFFICE
CERTIFICATE OF CORRECTION

Patent No. 3,412,134                          November 19, 1968

Daniel G. Jones

It is certified that error appears in the above identified patent and that said Letters Patent are hereby corrected as shown below:

Column 2, line 12, "$+3H^z$" should read -- $+3H_2$ --; line 13, "propylene" should read -- propyne --; line 27, "$CN_3$" should read -- $CN$ --. Column 3, line 48, "zeolite Z" should read -- zeolite X --. Column 5, line 6, "2:5" should read -- 2.5 --. Column 6, line 2, "ironically" should read -- ionically --.

Signed and sealed this 10th day of March 1970.

(SEAL)
Attest:

Edward M. Fletcher, Jr.                       WILLIAM E. SCHUYLER, JR.
Attesting Officer                                Commissioner of Patents